US009847858B2

(12) United States Patent
Oksman et al.

(10) Patent No.: US 9,847,858 B2
(45) Date of Patent: Dec. 19, 2017

(54) METHOD OF DYNAMIC DISCONTINUOUS OPERATION FROM A DISTRIBUTION POINT

(71) Applicant: Lantiq Deutschland GmbH, Neubiberg (DE)

(72) Inventors: Vladimir Oksman, Morganville, NJ (US); Dietmar Schoppmeier, Unterhaching (DE); Charles Bry, Unterhaching (DE); Stefan Uhlemann, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 14/435,195

(22) PCT Filed: Oct. 14, 2013

(86) PCT No.: PCT/EP2013/071440
§ 371 (c)(1),
(2) Date: Apr. 13, 2015

(87) PCT Pub. No.: WO2014/057137
PCT Pub. Date: Apr. 17, 2014

(65) Prior Publication Data
US 2015/0256311 A1    Sep. 10, 2015

Related U.S. Application Data

(60) Provisional application No. 61/713,523, filed on Oct. 13, 2012.

(51) Int. Cl.
*H04J 3/22*   (2006.01)
*H04L 5/00*   (2006.01)
(Continued)

(52) U.S. Cl.
CPC ............ *H04L 5/0044* (2013.01); *H04L 47/10* (2013.01); *H04L 47/826* (2013.01)

(58) Field of Classification Search
USPC ....... 370/252, 437, 474, 466, 349, 389, 392, 370/328, 395.1, 395.2, 395.6, 412, 469
See application file for complete search history.

(56) References Cited

U.S. PATENT DOCUMENTS

| 5,311,516 A | 5/1994 | Kuznicki et al. |
| 7,269,186 B2 | 9/2007 | Abrol et al. |

(Continued)

FOREIGN PATENT DOCUMENTS

| JP | S60178727 A | 9/1985 |
| JP | 2004023311 A | 1/2004 |

(Continued)

OTHER PUBLICATIONS

International Search Report of International Application No. PCT/EP2013/071440.

*Primary Examiner* — Phuongchau Ba Nguyen
(74) *Attorney, Agent, or Firm* — Eschweiler & Potashnik, LLC

(57) ABSTRACT

Methods and apparatus to transmit data are disclosed. An embodiment comprises providing transmission opportunities for data to be transmitted. A transmission opportunity can comprise a payload portion for payload. The method comprises transmitting the payload portion. The payload portion comprises a beginning portion from beginning of the payload portion and a completion portion to completion of the payload portion. An embodiment comprises transmitting control information after the beginning portion is transmitted and before the completion portion of the payload portion (Continued)

is transmitted. In an embodiment the control information is indicative of a future completion of the transmitting the payload portion.

11 Claims, 7 Drawing Sheets

(51) Int. Cl.
*H04L 12/801* (2013.01)
*H04L 12/911* (2013.01)

(56) References Cited

U.S. PATENT DOCUMENTS

| | | | |
|---|---|---|---|
| 7,542,482 B2 * | 6/2009 | Casaccia | H04L 1/0007 370/392 |
| 8,208,388 B2 * | 6/2012 | Casaccia | H04L 1/0007 370/252 |
| 2003/0035440 A1 | 2/2003 | Casaccia et al. | |
| 2008/0186946 A1 * | 8/2008 | Marinier | H04L 49/90 370/349 |
| 2009/0116490 A1 * | 5/2009 | Charpentier | H04L 1/1841 370/395.1 |

FOREIGN PATENT DOCUMENTS

| | | | | |
|---|---|---|---|---|
| JP | 2005286745 A | 10/2005 | | |
| JP | 2008177793 A | 7/2008 | | |
| JP | 2012134800 A | 7/2012 | | |
| WO | WO 02/37797 A1 * | 5/2002 | | H04L 29/06 |
| WO | 0245308 A1 | 6/2002 | | |
| WO | 2009001288 A2 | 12/2008 | | |

\* cited by examiner

METHOD OF DYNAMIC DISCONTINUOUS OPERATION FROM A DISTRIBUTION POINT

This application is entitled to and claims the benefit of Provisional Patent Application No. 61/713,523, filed Oct. 13, 2012.

Adjacent devices can be physically connected by a communication channel such as telephone lines, coaxial cables, optical fibres, or satellites. In theory, an implication of such a physical link is that the data bits are delivered in exactly the same order in which they are sent. The physical link has no inherent storage capacity, therefore the delay involved is the propagation delay over the link. Transmission of data over the link would be very simple indeed if no error ever occurred. In a real physical link this can be different. Natural phenomena such as noises and interference are introduced into the link causing errors in detecting the data. There is a propagation delay in the link. There is a finite data processing time required by the transmitting and receiving stations. A data link protocol thus has to be designed to ensure an error-free transmission and also to achieve an efficiency of the data transfer as high as possible.

The Digital Subscriber Line (DSL) technology, during all its history, attempted to increase the bit rate in the aim to deliver more broadband services to the customer. Unfortunately, copper loops deployed from the Central Office (CO) to customer premises (CPE) are rather long and do not allow transmission of data with bit rates more than few Mb/s. To increase the bit rates, modern access networks use street cabinets, MDU-cabinets, and similar arrangements: cabinets are connected to the CO by a high-speed backbone communication line, like multi-gigabit passive optical network (GPON) and installed close to the customer premises. From these cabinets, high-speed DSL systems, such as Very-High-Bit-Rate DSL (VDSL), can be deployed. The current VDSL systems (ITU-T Recommendation G.993.2) have range of operation about 1 km, providing bit rates in the range of tens of Mb/s. To increase the bit rate of VDSL systems deployed from the cabinet, recent ITU-T Recommendation G.993.5 defined vectored transmission that allows increasing bit rates up to 100 Mb/s per direction.

However, recent trends in the access communications market show that 100 Mb/s is still not sufficient and bit rates up to 1.0 Gb/s are required. This could be only achieved if copper pairs connecting the CPE as short as 50-100 m. Operation using so short loops requires installation of many small street/MDU cabinets called Distribution Points (DP) that intend to serve a very small number of customers, such as 8-16, as shown by recent analysis. Some sources report on higher number of served users, like 24 or even 32. Therefore, DPs shall allow very flexible installation practices: they should be light and easily installed on a pole or house wall, or basement, without air-conditioning. The most challenging issue for these flexible connection plans is providing DPs with power. The only solution found is so-called "reverse feeding" when the equipment of the DP is fed by the connected customer.

These, and also some other requirements bring substantial restrictions of the power consumption of a DP. Therefore special means to reduce power consumption are developed.

There are number of ways to reduce power consumption of the DP including sleeping modes, reduced transmit power, use of silence periods (short sleeping mode) and so on. One way is also to stop transmission (and reception, correspondingly) on short term basis when there is no data to transmit. This way of operation, together with the others mentioned, is intended to be used in modern DSL systems installed at the DP. Similar methods are used in some wire-line home networking equipment and some wireless systems as well.

A typical way of so called "discontinuous operation" is not to transmit symbols when there is no data to send. This principle can be easily implemented in low-bit rate narrowband systems operating at high signal-to-noise (SNR). As an example with this type of system, a receiver can simply monitor the power of the received signal—loss of power indicates no transmit signal and receiver can turn to sleeping mode too.

Modern DSL (and especially those deployed from DP, since they operate in a very wide frequency band, up to 100-200 MHz), operate at very low SNR, sometime even negative. Therefore, direct physical measurement of receive power can be almost impossible.

One or more embodiments of the invention offers solutions that can further reduce power consumption, thus making DP equipment indeed flexible and inexpensive.

One way to further reduce power consumption is to inform the receiver on how many symbols will be transmitted. With this information, the receiver may get prepared to switch off right after the last symbol of the transmission format is received.

One way is to set a duration of the transmission once to apply to transmission of a comparatively large quantity, such as once per superframe. Thus, the duration of the transmission can be communicated once, stored by the receiver, and used throughout transmission of the comparatively large quantity. But with this, current traffic patterns—in modern communications systems commonly complex—are hardly followed. For example, in case the quantity is a superframe, it is not possible to change the number of transmit symbols per fraction of a superframe, as would be needed to adapt transmission to frames that are smaller than the superframe. This results in lack of efficiency and long reacting time.

In a system using a Time Division Duplexing (TDD) method one other way is to communicate in each TDD frame the actual length of payload data transmitted in this same frame and other control information as needed. A problem is that bits of the frame carrying the length indicator can be erased. A further problem is that in some cases there might be insufficient time for the receiver to receive and decode the length information. A problem arises when new packets arrive during transmission of the frame because the length indicator sent at the beginning of the TDD frame cannot take into account the new packets incoming during transmission of the TDD frame.

Overview

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

In an aspect, a method as defined in the independent method claim is provided. In another aspect, a apparatus as defined in the independent apparatus claim is provided. In yet another aspect, a computer-readable medium as defined in the independent computer-readable medium claim is provided. The dependent claims define embodiments according to the invention in one or more aspects. It is to be noted that features of these embodiments may be combined with each other unless specifically noted to the contrary. For example, features of method embodiments may be implemented in embodiments of the apparatus. For example, features of an embodiment of the apparatus may be used to perform steps of an embodiment of the method.

The present invention applies to digital subscriber line (DSL) access networks, in particular deployed from a distribution point (DP), and other networks providing various services including voice telephone over DSL (VOIP), data transfer, video streaming, and the like. The present invention includes systems and methods that reduce power consumption of the DSL modems and associated equipment by providing a low power state, wherein a network device, such as a DSL modem, is at or near a zero power consumption state. The description, in an aspect according to some embodiments, describes a method for use in communications.

The described embodiments can be useful in communications. In comparison with conventional solutions at least one effect can be reduced power consumption.

This summary overview is submitted with the understanding that it will not be used to interpret or limit the scope or meaning of the claims. This summary overview is not intended to identify key features or essential features of the claimed subject matter. Other methods, apparatus and media are also disclosed. Those skilled in the art will recognize additional features and advantages upon reading the following detailed description, and upon viewing the accompanying drawings.

DETAILED DESCRIPTION OF THE INVENTION

Figure 1:
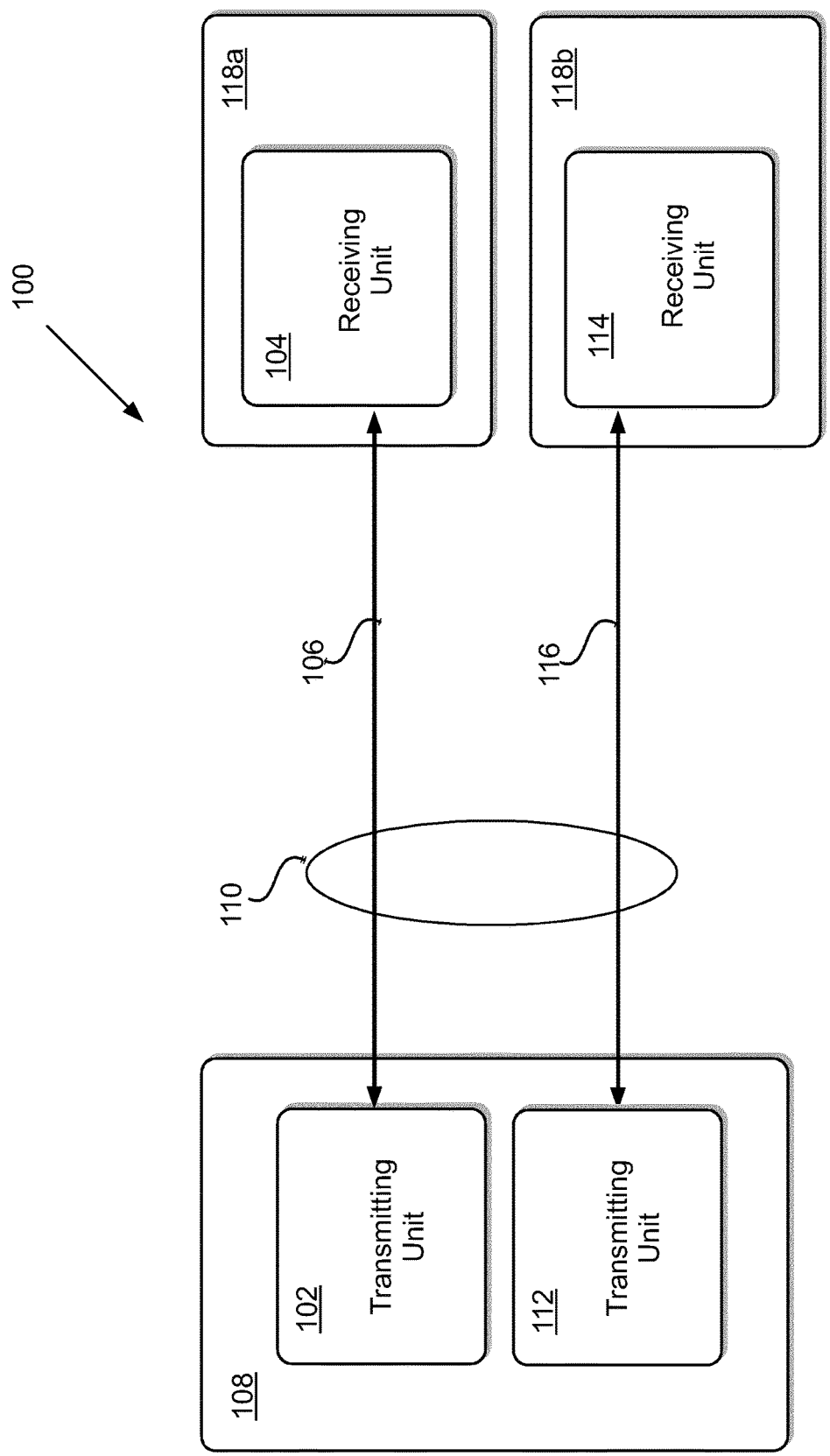
FIG. 1 is a block diagram illustrating a system utilizing a data transmission method in accordance with an embodiment of the invention.

In a first aspect, the invention encompasses a method to transmit data. An embodiment according to the invention in the first aspect comprises providing a transmission opportunity for data to be transmitted. In an embodiment a transmission opportunity is configured to comprise a payload portion for payload data. The method comprises transmitting the payload portion. In an embodiment the payload portion comprises a beginning portion from beginning of the payload portion and a completion portion to completion of the payload portion. An embodiment comprises transmitting control information after the beginning portion is transmitted and before the completion portion of the payload portion is transmitted. In an embodiment the control information is indicative of a future completion of the transmitting the payload portion. In some embodiments the control information, during transmission of the payload portion, is indicative of a future use of a different transmission mode for transmitting the payload portion. In an embodiment the transmission opportunity is one in a plurality of other transmission opportunities. In some embodiments, the plurality of transmission opportunities, i.e., the one and the other transmission opportunities are provided sequentially so that, on a given transmission medium, at one time there is not more than one transmission opportunity transmitted.

In a variant of the first aspect, the invention encompasses a method, for use in data transmission, comprising providing a plurality of transmission opportunities for data to be transmitted, wherein a transmission opportunity in the plurality of transmission opportunities is configured to comprise a payload portion for payload data; and transmitting the payload portion. The transmitting the payload portion comprises transmitting, in this sequence, a beginning portion, control information indicative of a completion of the payload portion, and a completion portion. Both, the beginning portion and the completion portion, can be used to transmit payload data.

At least one effect can be that a receiver of the transmitted payload portion, while receiving the payload portion, can prepare for a time after completion of the transmission of the payload portion. For example, this preparation can allow the receiver to perform certain functions right after receiving the payload, such as shut itself down till the next expected portion of payload data. As an effect, power consumption can be reduced.

In an embodiment payload data is transmitted in symbols, and the control information is provided in the place of at least one symbol. In an embodiment the place of the at least one symbol is configurably predetermined. In an embodiment a configuration can be defined during initialisation. In an embodiment the configuration can be defined during data transmission. In another embodiment the configuration can be defined according to a media access plan. At least one effect can be that a receiver can limit watching incoming signals to watching the signal at the predetermined place of the at least one symbol in order to identify if the control information was received in this place.

In one ore more embodiments the transmission opportunity is provided as a time slot predetermined for data transmission from a transmitter to a receiver.

In an embodiment the control information is provided as a message informing on a quantity remaining to completion of payload transmission. In an embodiment the quantity is time. In an embodiment the message is one in a group consisting of duration, number of symbols, and packets, in particular data packets.

In another embodiment the control information is indicated by a flag. At least one effect can be that the information can be predetermined and the flag can be associated with the predetermined information so as to be indicative of that predetermined information. In contrast, a conventional message includes the information. In an embodiment the flag is associated with different meaning in different modes of operation. At least one effect can be that a flag can be interpreted differently depending on a state of operation of a receiving unit. For example, while in a high power state or full performance mode, the flag, for example an idle symbol, can be indicative of a future completion of the transmitting the payload portion. In another example, the flag can be transmitted after any payload data presently available for transmission were already transmitted, while the payload portion, for the time being, continues to be transmitted, however the flag being indicative of a future change of transmission mode.

In some embodiments the flag, being transmitted in a first mode of transmitting the payload portion, is associated with future transmitting the payload portion in a second mode of transmitting the payload portion. In an embodiment the flag can be one in a group consisting of symbol, predetermined management message, and data pattern.

In some embodiments the flag, in a first state of operation of transmitter and/or receiver, is associated with an idle operation. Further, the flag, in a second state of operation of transmitter and/or receiver is associated with there being payload to be transmitted to completion of the transmitting the payload portion. For example, the first state of operation can be low power state while the second state of operation can be an high power state or full performance mode. Further states of operation can be implemented and, accordingly, the flag can be associated with further meaning or be indicative of further changes of transmission mode used for transmitting the payload portion.

In an implementation, for example in a system using a plurality of communication links, the first mode of transmitting the payload portion can be used to transmit payload on a first set of communication links. The first set of communication links can comprise all communication links.

In some embodiments, once a criterium is met, the flag can be used to indicate future use of the second mode of transmitting the payload portion. For example, the criterium can be completion of payload transmission for at least one of the communication links in the first set of communication links. Other criteria than completion of payload transmission can be implemented.

In an implementation, the second mode of transmitting the payload portion can require less power than the first mode of transmitting the payload portion. The second mode of transmitting the payload portion can be used to transmit payload on a second set of communication links. The second set of communication links can be the same set as the first set of communication links or the second set can form part of the first set of communication links. In an implementation the second set of communication links can be the first set excluding those communication link(s) where transmission of the payload was completed.

Communication links can comprise each a transmitter, a transmission medium such as a twisted pair (herein: line) as used in digital subscriber lines and a receiver. Crosstalk from one transmission medium to another can occur, since the transmission media can be coupled. In particular lines can be comprised in a binder.

Modes of transmitting the payload portion can, for example, differ in terms of bit allocation, power spectrum density or other transmission parameters. Further transmission modes can be implemented.

Thus, the flag being transmitted in the first mode of transmitting the payload portion is associated with future transmitting the payload portion, in particular during the present transmission opportunity, going to be in the second transmission mode. At least one effect can be to enable the receiver to operate in a first mode of reception, for example in a continuous reception mode, until the flag is received. Upon receiving the flag the receiver henceforth operates in a second mode of reception, for example a discontinuous reception mode, wherein a further flag received can, for example, be interpreted to be indicative of the completion of the transmitting the payload portion. In a system having a plurality of communication links, each with transmitter, transmission medium and receiver, the flag implements timelines, one timeline per communication link, as transmission modes are changed in accordance with the flag.

In one or more embodiments of the invention the transmitting the payload portion uses a plurality of carriers. In an embodiment the transmitting the flag uses a subset of the plurality of carriers. At least one effect can be that using the subset of carriers allows at least one other carrier in the plurality of carriers to continue transmitting the payload portion while using the subset of the plurality of carriers for transmitting the control information. This enables to trade off transmission improvement versus quality of control information signal.

One or more embodiments of the invention the payload portion transmits zero payload. At least one effect can be that while the transmission opportunity provides opportunity to transmit payload in the payload portion, the opportunity does not necessarily require any payload to be transmitted and thus provides flexibility to transmit payload as needed by a user.

In one or more embodiments of the invention the control information forms part of transmitted payload data. At least one effect can be that no particular protocol may be needed, since, upon extracting the control information from payload data, the control information can be processed as is by the receiver. In an embodiment the control information is transmitted at a time sufficiently early in transmitting the payload data to allow a receiver to change a mode of operation at the time of completion of payload data transmission. In an embodiment an optimisation consideration is used to determine when to send the control information. The optimisation consideration can take into account information on packet arrivals on a higher layer in a multi-layer transmission model/multi-layer communications protocol. The optimisation can take into account future retransmission requests. At least one effect can be that accuracy of duration prediction, in particular, taking account of error and, accordingly, attempts to retransmit payload data, until completion of payload data transmission, can be large while reducing power consumption in having the receiver change into a power safe mode soon after completion of payload data transmission.

In one or more embodiments of the invention the control information is represented in an analog signal. In an embodiment the analog signal can be provided dependent on a physical medium. At least one effect can be that the analog signal requires less processing resources for detection than a digital signal. Consequently, detection of the determining of the control information that the transmitting the payload portion is about to be completed and thus come to an end, can be fast. Thus, an uncertainty about an amount of data remaining to be transmitted using the transmission opportunity, the uncertainty for example due to retransmission of payload data, can be further reduced as the transmitting the control information can be still closer to completion of transmitting the payload portion. In an embodiment the analog signal is physical medium dependent (PMD) sub-layer signal, wherein the sub-layer is a sub-layer in a multi-layer communications protocol.

One or more embodiments of the invention comprises, within a single frame, transmitting multiple control information at different times. In an embodiment the multiple control information is indicative of duration, for example, in terms of time, symbols or packets, while the transmission opportunity lasts and while transmitting the payload portion is completed before another payload portion will be transmitted. At least one effect can be that a receiver can, while still receiving payload data, already prepare for timely change into a low power mode of operation.

One or more embodiments of the invention comprise transmitting, at least after completion of the transmitting the payload portion, another control information indicative of time. At least one effect can be that, to enable time keeping on the receiver side while transmitting payload is completed. In an embodiment the another control information is represented by sync symbols or pilot tones. In an embodiment the transmitting the sync symbols is periodic.

One or more embodiments of the invention comprise defining a unique signal pattern indicative of a predetermined quantity. An embodiment comprises defining a unique tone pattern indicative of a predetermined quantity. In some embodiments the quantity is one of duration, time and period. In some embodiments the quantity is a symbol, wherein the symbol is predefined to be transmitted for a certain amount of time.

One or more embodiments of the invention comprises defining a protocol to perform steps of the method. In one embodiment the protocol conforms to performing data transmission using a multi-layer transmission scheme.

In a second aspect the invention encompasses a communication device, the communication device comprising a transmission generating unit adapted to generate a plurality of symbols. At least one symbol in the plurality of symbols includes a particular data pattern to identify that it is acceptable for a receiver to alter a state, for example, to enter a reduced power state. In an embodiment at least one symbol proceeds and at least one symbol follows the at least one of the plurality of symbols including the particular data pattern.

In another aspect the invention encompasses a method, comprising generating, using a communication device, a plurality of symbols, at least one of the plurality of symbols including a particular data pattern to identify that it is acceptable for a receiver to enter a reduced power state. Herein a power state can also more generically be called a state of operation. However, a state of operation is not necessarily discriminated against another state of operation by power level. A reduced power state can also be called a low power mode of operation.

In an implementation of the communication device at least one symbol proceeds and at least one symbol follows the at least one of the plurality of symbols including the particular data pattern.

In a third aspect the invention encompasses a computer-readable medium storing instruction code thereon. The instruction code, when executed, causes one or more processors, for example, in an apparatus according to the invention in the second aspect, to perform some or all steps of the method according to the invention in the first aspect.

In an embodiment the transmission opportunity is provided as a frame. In an embodiment, the frame can be a Time Division Duplex (TDD) frame. One or more embodiments of the invention thus presents a transmission method that provides flexibility in picking a number of transmit symbols in every TDD frame. The method can be reliable, offer quality of service (QoS), and provide efficient power saving at both a distribution point (DP) and a customer premises equipment (CPE).

One or more embodiments according to the invention in the first aspect can implement a principle of discontinuous operation which is to cease transmission of symbols after all user data transmission units (DTU), also called "data transfer unit", necessary to be transmitted during the TDD frame are sent.

Further Illustrated Embodiments

FIG. 1 is a block diagram illustrating a communication link 100 utilizing a data transmission method in accordance with an embodiment of the invention and described in detail below.

Communication link 100 comprises a distribution point (DP) 108, having transmitting units, transmitter 102 and transmitter 112, and a number of customer premises units (CPU) 118a and 118b each having a receiving unit, receiver 104 and 114, respectively. In an embodiment transmitter 102 and receiver 104 are coupled for data transmission by a twisted pair (further called "line") 106; likewise transmitter 112 and receiver 114 are coupled by line 116.

Portions of line 106 and of line 116 are kept in one binder 110. In binder 110 crosstalk between multiple lines 106 and 116 and other, if any, can occur. As described above, crosstalk can form an impediment to conventional detection of an end of payload being transmitted. For example, if payload transmission is completed on line 106 while payload transmission continues on line 116, signal transmitted on line 116 would provide a crosstalk signal on line 106 and thus also be received by receiver 104. Consequently, receiver 104 would receive a signal on line 106 and, depending on the strength of the received crosstalk signal, perhaps not be capable to notice that this signal should be ignored.

In the example shown in FIG. 1 transmitter 102 and receiver 104 include processing circuitry to process data and provide signals for transmission of data on line 106. However, in another embodiment communication link 100 can use, for data transmission, other transmission media than line 106. For example, another transmission medium can be wireless. Yet another transmission medium can, for example, be optical fiber.

In an embodiment transmitter 102 and/or receiver 104 can be collocated with another receiver and another transmitter, respectively. In some embodiments transmitter 102 and the another receiver can form a first transceiver. Likewise receiver 104 and the another transmitter can form a second transceiver. The same can apply to other transmitters 112 and/or receivers 114. Herein, to illustrate the example, two transmitters/receivers are illustrated in the distribution point as well as two corresponding two customer premises units and correspondingly two transmitters/receivers coupled to the distribution point are shown. The number, however, can be different from two. In particular the number can be larger.

Herein a reference to transmitter 102 shall also mean a reference to the first transceiver. In an embodiment the first transceiver can be located at a distribution point (DP). Accordingly, herein the first transceiver is also called DPU (DP-unit). Further, herein a reference to receiver 104 shall also mean a reference to the second transceiver. In an embodiment the second transceiver can be deployed at a customer side. Accordingly, the second transceiver is also called CPU (Customer premises unit). A transmission direction from DPU to CPU is called "downstream (DS)" while the opposite transmission direction from the CPU to the DPU is called "upstream (US)". Transmitter 102, 112 located at the Distribution Point Unit (DPU) 108 and thus at a network side of line 106, 116, can also be referred to as FTU-O while receiver 104, 114 located at a network termination (NT) at the customer premises side of line 106, 116 can also be referred to as FTU-R.

In some embodiments, with communication link 100 having line 106, communication link 100 is configured to transmit data in accordance with a digital subscriber line (DSL) standard. Merely as one example amongst many possible implementations, communication link 100 can be configured to use protocols and perform methods as defined in recommendations of the International Telecommunication Union (ITU). To give only one example out of many possible recommended or otherwise standardized implementations, an embodiment could be implemented and configured so as to perform data transmission according to a recommendation known as 'G.fast'. In fact, the description shows that many other implementations are possible in systems that are configured to transmit data from a transmitter to a receiver using a transmission opportunity.

Figure 2:
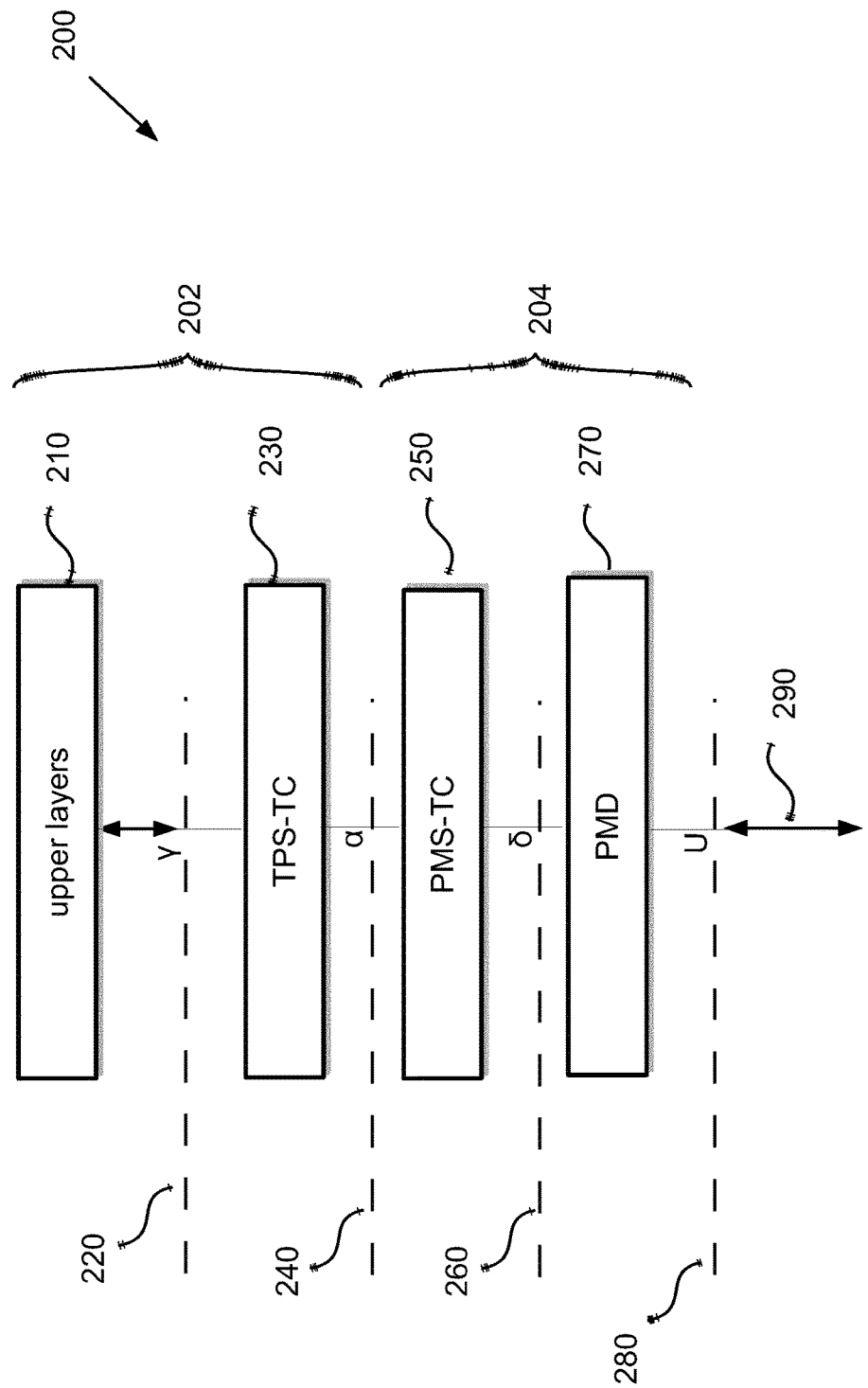
FIG. 2 is a schematic illustration of an example of a multi-layer protocol structure in accordance with an embodiment of the invention.

In one implementation communication link 100, in particular transmitter 102 and receiver 104, are configured for data communication in accordance with a multi-layer communication model 200 as illustrated schematically in FIG. 2.

In some embodiments as shown in FIG. 2, multi-layer communication model 200 contains an application-specific section 202 and an application-invariant section 204. In the embodiment illustrated in FIG. 2, application-specific section 202 connects to upper layers 210 across an interface ("γ-reference point") 220 and includes a transport protocol specific part of a transmission convergence sub-layer, (TPS-TC) sub-layer 230. Connected to application specific section 202, by an interface (in transmitter 102: "α reference point", in receiver 104: "β reference point") 240, is an application-invariant section 204 that comprises a physical media specific part of the transmission convergence sub-layer, (PMS-TC) 250. Further, connected across an interface 260 ("δ reference point"), application-invariant section 204 comprises a physical medium dependent (PMD) sub-layer 270. Further, multi-layer communication model 200 contains a physical medium 290 connected across an interface 280 ("U reference point") to physical medium dependent (PMD) sub-layer 270.

In some embodiments, a reference point can comprise one or more logical (non-physical) information-transfer interfaces, and one or more physical signal-transfer interfaces. The α, β, γ reference point interfaces, in some implementations, are only logical separations and are defined as a set of functional primitives; they are not expected to be physically accessible.

In some embodiments transmission convergence sub-layer (TPS-TC) 230 is provided to convert applicable data transport protocols into a unified format required at α (or, as the case may be, at β) reference point interface 240 and to provide bit rate adaptation between user data and a data link established by transmitter 102. The transmission convergence sub-layer can provide frames, sometimes called data transmission units or data transfer units (DTU), composed of data bits and used as a container to transfer these data bits transparently between α-reference points of peer transceivers. In other words, data is passed between peer transceivers by sets, each encapsulated into a single DTU. Thus, DTUs are exchanged over the α reference point between the TPS-TC and PMS-TC sub-layers.

PMS-TC sub-layer 250 can then contain framing and frame synchronization functions, as well as forward error correction (FEC), error detection, interleaving and de-interleaving, scrambling and descrambling functions. In an embodiment, PMS-TC sub-layer 250 provides an overhead channel that can be used to transport management data (control messages). Other functions can be comprised in communication model 200 such as a management protocol MPS-TC that converts incoming management data into a the unified format required at α reference point interfaces 240 to be multiplexed into sub-layer PMS-TC 250. The management information can contain indications of anomalies and defects, and related performance monitoring counters, and management command/response messages facilitating procedures defined for use by higher layer functions, specifically for testing purposes.

In some embodiments physical medium dependent (PMD) sub-layer 270 forms a data link layer to transfer blocks of data without error between two adjacent devices. The data link layer provides functional and procedural means to transfer data between network entities and might provide the means to detect and possibly correct errors that may occur in the physical layer.

In some embodiments functions of PMD sub-layer 270 are symbol timing generation and recovery, encoding and decoding, and modulation and demodulation. PMD sub-layer 270 may also include echo cancellation and line equalization. In an embodiment the PMD function shall provide data transmission frame including data symbols.

Figure 3:
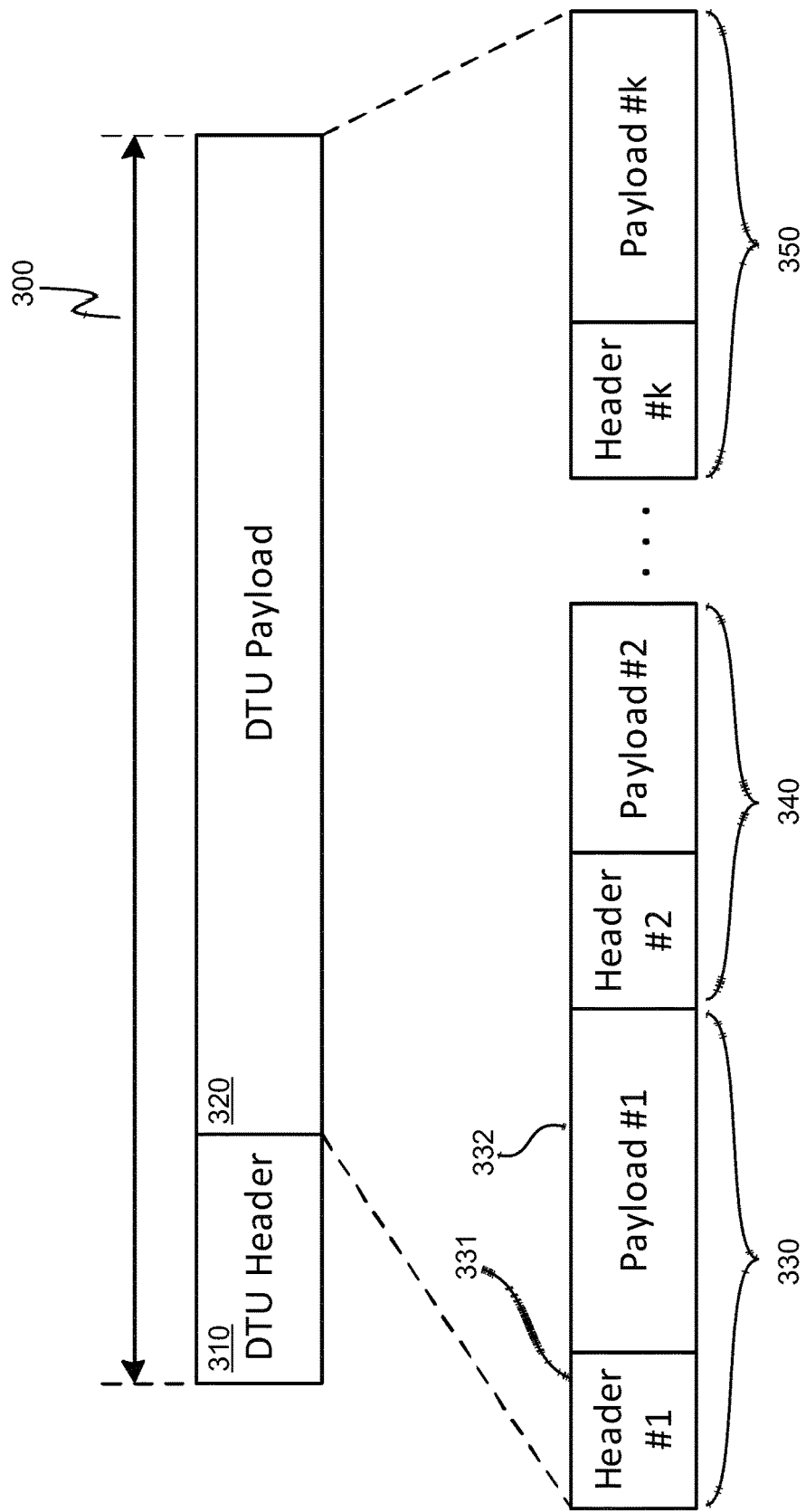
FIG. 3 is a block diagram showing a data transmission frame in accordance with an embodiment of the invention.

FIG. 3 is a block diagram showing an embodiment in accordance with an embodiment of the invention wherein a data transmission unit 300 comprises a data transmission unit header (DTU-header) portion 310 and a data transmission unit payload (DTU-payload) portion 320. Payload portion 320 can consist of a number of frames 330, 340, 350, each containing header section 331 and payload section 332. In an embodiment DTU-header portion 320 can indicate a type of unit 300; and a length of unit payload portion 320. In some embodiments length of header portion 310 and maximum length of the unit payload portion 320 can depend on the unit type 300. For all unit types except an Idle unit type, the length of the header is extended to indicate longer payloads.

Figure 4:
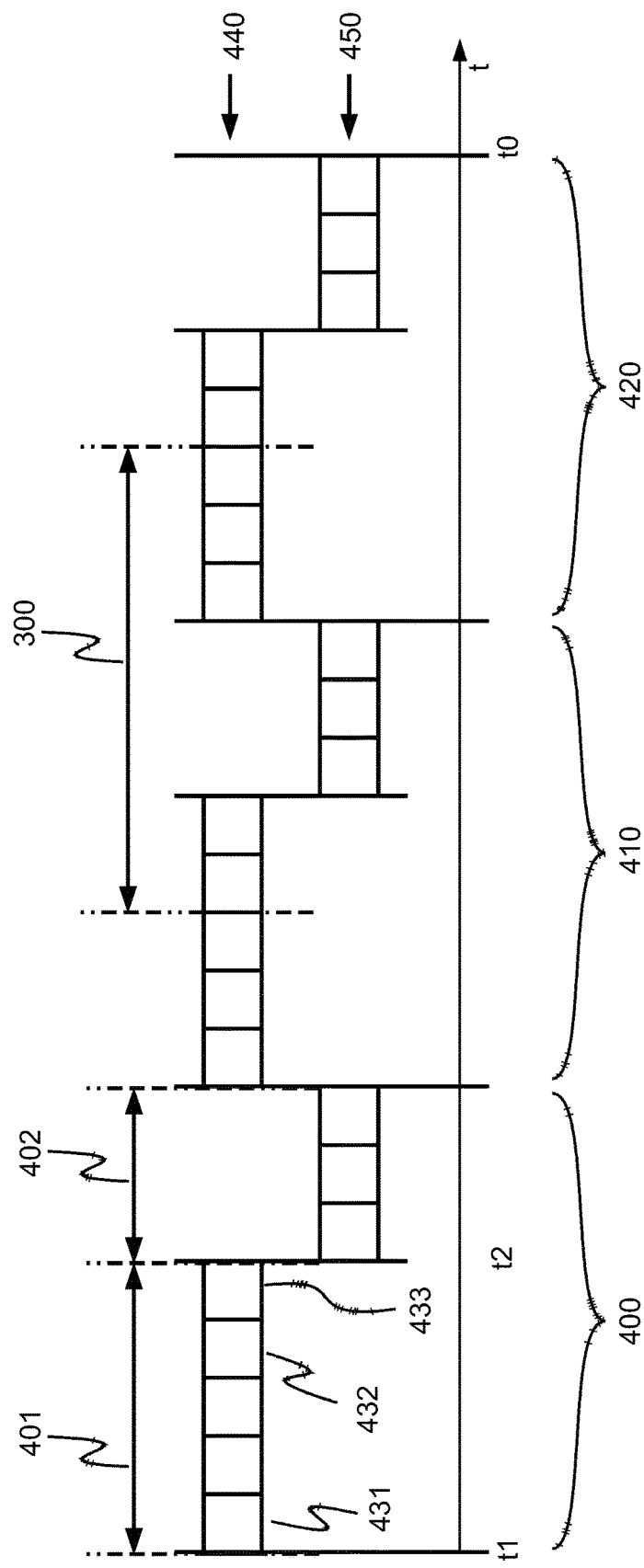
FIG. 4 is a diagram illustrating an exemplary transmission scheme in accordance with an embodiment of the invention.

In some embodiments, transmitter 102 (first transceiver) and receiver 104 (second transceiver) are configured to perform time divisional data communication. FIG. 4 is a diagram illustrating a transmission scheme in accordance with some implementations of the invention, wherein communication system 100 operates using a synchronized time division duplex (STDD) communication.

According to some implementations a period of transmission using STDD communication can be divided into time division (TDD) frames of same duration (shown in FIG. 4 at reference numerals 400, 410, 420). In accordance with the invention, for example, frame 400 can provide a first opportunity 401 to transmit data downstream from first transceiver 102 to second transceiver 104. Likewise frame 400 can provide a second opportunity 402 to transmit data upstream from second transceiver 104 to first transceiver 102.

In some implementations, during transmission of frame 400, there can be a certain transmission opportunity time or period assigned to each direction of transmission. For example, a first period can be assigned to first transmission opportunity 401 to last during frame 400. The first period, in some implementations, may be as long as the length of frame 400. In an implementation the length of the first period can be predetermined. Likewise, a second period can be assigned to a second transmission opportunity 402 to also last during frame 400 in a time interval where the first transmission opportunity 401 is not available. First and second period can be same or differ, as need be. For example, heavy data traffic request in the downstream direction may coincide with low data traffic request in the upstream direction. Accordingly, the first period applied in data transmission in the downstream direction may be longer than the second period applied in data transmission in the upstream direction.

In some implementations, payload data are provided for transmission in symbols each of a same length, herein also called symbol period. Now, for instance, if frame 400 contains 40 symbol periods, a possible share of transmission opportunities is: 30 period symbols in downstream direction, 9 symbols in the upstream direction, and 1 symbol to facilitate guard time between upstream and downstream transmissions. Other sharing up of use of frame 400 between downstream transmission opportunity 401 and upstream transmission opportunity 402 is possible.

In an embodiment transmission opportunity can be used to denote or mark a set of symbol positions in frame 400 on which transmission is allowed in a particular transmission direction. During transmission of frame 400, the entire transmission opportunity is not necessarily utilized.

Sending to the other side beforehand an indication as to the actual number of symbols to be transmitted in the frame has issues concerning both latency and reliability, as described above. One or more embodiments of the invention proposes to transmit control information such as a closing flag indicative of information instead of transmitting information such as a length indicator itself. At least one effect can be an improvement in system performance, for example of a data processing system on the side of receiver 104 and used for extracting and processing data from signals received such as signals received from transmitter 102. Also, system architecture may be simpler in this case since the flag can be provided at a lower layer than a message comprising the information. The data processor system can also be more flexible since it can, for example, be left to receiver 104 to process the flag or not. If not, the benefit associated with the flag as an indicator to information may be missed on such a receiver 104. But thus, data transmission can be performed with receiver 104 being provided as legacy equipment that may not be capable to use the flag and that therefore will ignore the benefit.

Figure 5:
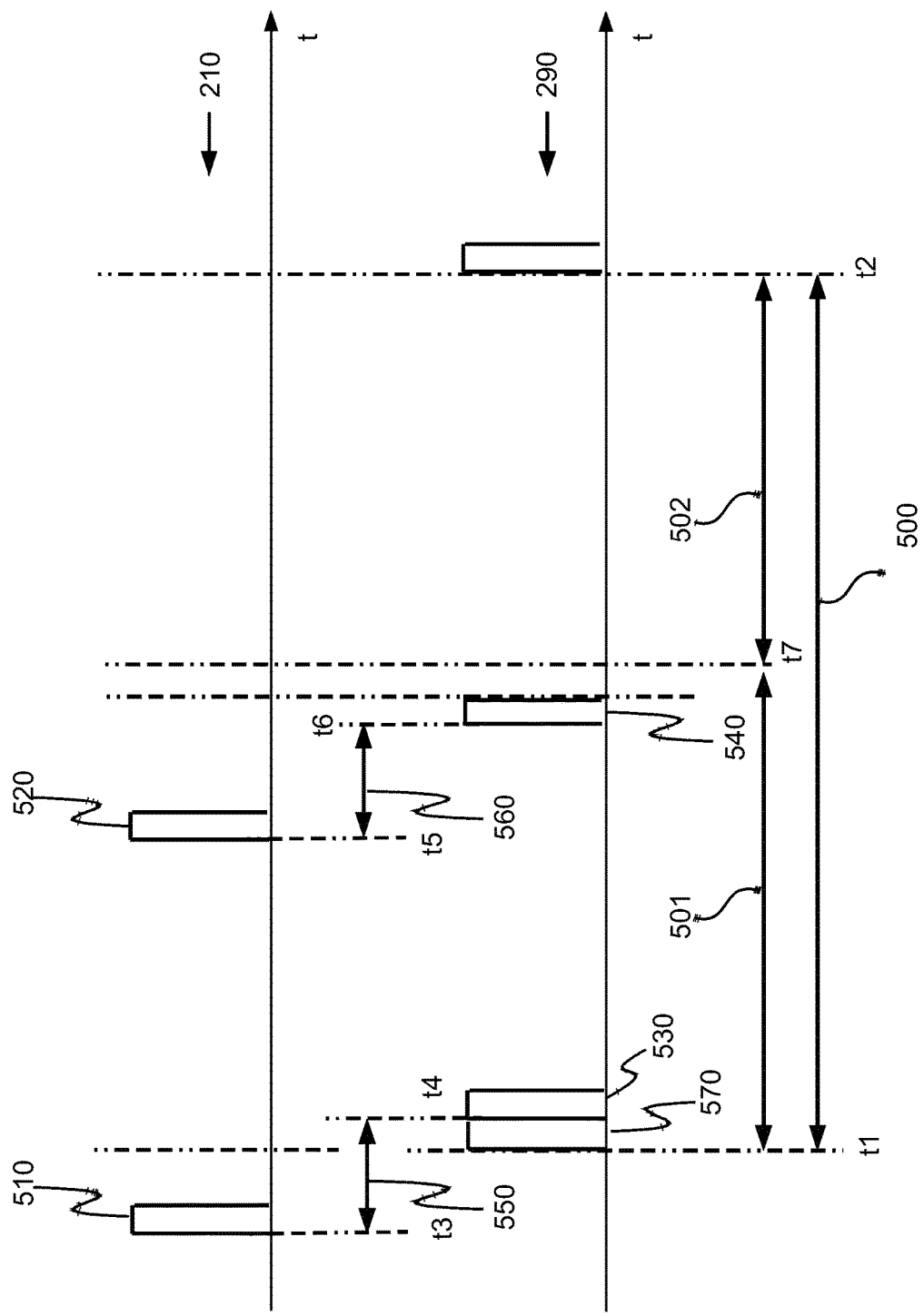
FIG. 5 is a time diagram illustrating a time line with a data transmission frame in a multi-layer protocol according to an embodiment of the invention.

In a solution, a data symbols can be transmitted in frames 500 wherein the number of data symbols in a respective frame 500 can vary from frame to frame. FIG. 5 is a time diagram illustrating an embodiment of transmission of a time frame 500, for example in the downstream direction from transmitter 102 to receiver 104 in a multi-layer protocol such as described above with reference to multi-layer communication model 200 shown in FIG. 2.

Now operation of an embodiment will be described with reference to FIG. 4. In an example a transmission opportunity 401 may allow transmission form transmitter 102 downstream to receiver 104 of a predetermined number of bytes such as 25.000 bytes of user data in frame 400 transmission opportunity. This number may, for example, depend on a particular set of modulation parameters and transmission opportunities in frame 400. In a case where transmitter 102 has merely less than 25.000 bytes of user data to transmit, according to an implementation transmitter 102 can use a discontinuous operation wherein transmitter 102 transmits only an actual number of user data bytes that transmitter 102 has to sent during frame 400. If this actual number is less than 25000 bytes, say, 12500 bytes, then only roughly half of the transmission opportunity time will be used for transmission. Accordingly, only half of symbols will be sent compared with a system that does not use discontinuous operation where transmitter 102 should completely fill up the assigned transmission opportunity by sending idle bytes after no data bytes are ready for transmission.

Discontinuous operation allows for a number of data symbols to be transmitted during each TDD frame in each transmission direction may be different: a maximum number of symbols that transmitter 102 can transmit is determined by the assigned transmission opportunity 401 for a particular direction, while the minimum number of symbols may be less and may also be zero if no used data is ready for transmission for a particular frame 400.

Some solutions inform receiver 102 on a number of symbols that will be actually transmitted in the frame beforehand, sending a message to communicate management information such as a Medium Access Plan (MAP) management message or, for example, a robust management channel symbol, communicated from transmitter 102, for example in a distribution point, to receiver 104, for example in a CPE. The MAP management message may be sent every frame 400 or every several frames such as once per superframe, wherein a superframe may comprise a plurality of DTUs 300. Given its lengths, a superframe typically covers a number of frames 400. Further, in the embodiments illustrated, one frame 400 includes a first block of downstream (DS) symbols and a second block of upstream (US) symbols. As the case may be, a symbol can carry one DTU, a number of DTUs, or a fraction of a DTU.

Further having regard to operation in some embodiments, as illustrated in FIG. 5, time frame 500 begins at t2 and lasts through t1. Frame 500 includes a transmission opportunity 501 that lasts from t2 through t7.

Referring first to application upper layer 210, FIG. 5 illustrates an example of transmitting a first data packet 510 at time t3 and a second data packet 520 at time t5. For example, The first data packet 510 at t1 can be referred to the input from application layer 210 across γ-reference point interface 220.

In the example of FIG. 5, first data packet 510 and second data packet 520 are transmitted with transmission of time frame 500. More particularly, first data packet 510 is transmitted, at time t4, in a first DTU 530. First DTU 530 is the first DTU to be transmitted in frame 500. Second data packet 520 is transmitted, at time t6, in a second DTU 540. Second DTU 540 is the last DTU to be transmitted in transmission opportunity 501 of frame 500. Time is needed for processing in transmitter 102 to perform all necessary operations of the transmit path. Consequently, as illustrated in FIG. 5, a first delay 550 occurs as first data packet 510 is processed from application layer 210 across γ-point reference and other interfaces as described above to physical layer 290, for example, on line 106. Likewise a second delay 560 occurs as second data packet 520 is processed from application layer 210 to physical layer 290.

In the example shown in FIG. 1, length information on a number of actually symbols to be transmitted in frame 500 is provided. This control information is sent at the beginning of frame 500. In the example presented in FIG. 5, the length information is sent in a special symbol at the start of the DS transmission opportunity. Herein 'special' means having a degree of uniqueness that sets the special symbol apart from other symbols and thus lends itself to analysis for detection of the special symbol to be associated with some predetermined information. To provide length information, DTU transmitter 102 needs to know how many packets will arrive from γ-interface 220 prior to t2 when transmission of frame 500 starts and when the length information is sent. Any packets arriving at γ-interface 220 after the length information is released to transmission is not accounted for in transmitted frame 500 but will only be taken into account for a subsequent transmission opportunity. Thus, second packet 520 is to be transmitted during a following frame (not shown in FIG. 5). Thus, using a length indicator results in long additional delays to the sending of packets.

In some implementations according to the invention, transmitter 102 may provide flag (herein also called marker) 580 for transmission after DTUs 300 are sent. In one embodiment flag 580 is to be sent after all DTUs 300 are sent. In some embodiments flag 580 is sent after a majority of DTUs 300 is sent. In some embodiments flag 480 is sent when only a predetermined number of DTUs 300 is left to be sent using the present transmission opportunity provided in frame 500.

In an embodiment flag 580 is provided as a special symbol or a special management message, or a special data pattern sent on dedicated tones. Transmitting flag 580 as a part of user data is also possible. Extraction of flag 580 may in some embodiments need extra processing in transmitter 102 and/or in receiver 104.

If upon receipt of transmission opportunity 501 in frame 500, receiver 106 detects the flag 580, in some implementations receiver 106 can be interpret flag 580 as control information indicative of a completion of payload data transmission is imminent. Here, 'imminent' can mean a predetermined number of DTUs 300 will yet be received before completion of payload transmission from transmitter 102 to receiver 104. At least one effect can be that receiver 104 shuts down or otherwise enters a low power mode during a time gap between an end of DTU transmission at t7 and a start of transmission on the side of receiver 104.

Figure 6:
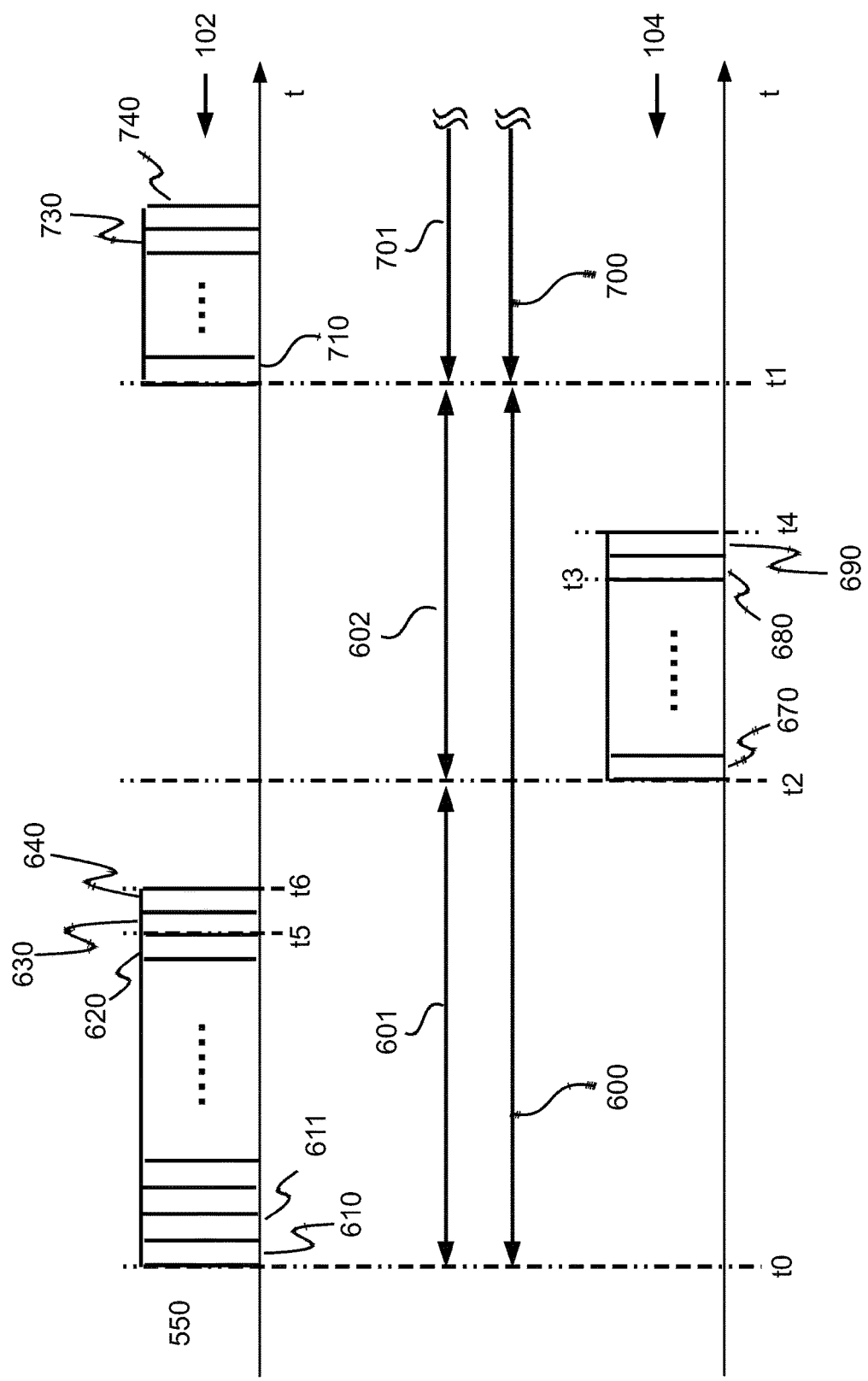
FIG. 6 is a time diagram illustrating duplex transmission in an embodiment according to the invention.

FIG. 6 illustrates duplex transmission in an embodiment using line 106. The transmission can be from transmitter 102, such as provided with a digital transmission unit (DTU), to receiver 104, for example provided with a customer premises unit (CPU). In an embodiment, a first transmission takes place in that a first time division duplex (TDD) frame 600 is transmitted from time t0 to time t1. Then, from time t1, a second TDD frame 700 is transmitted.

During transmission of first TDD frame 600 there is provided a first transmission opportunity 601 for downstream transmission from transmitter 102 to receiver 104. First transmission opportunity 601 lasts from time t0 to time t2. Further, during transmission of first TDD frame 600 there is provided a second transmission opportunity 602 for upstream transmission from another transmitter on the side of receiver 104 to another receiver on the side of transmitter 102. Second transmission opportunity 602 lasts from time t3 to time t4. During transmission of second time frame 700 there may be provided another first transmission opportunity 701 in the downstream direction and another second transmission opportunity (not shown) in the upstream direction.

During transmission of first transmission opportunity 601, at least one DTU, here DTUs 610, . . . , 620 and 640, are transmitted. Further, after DTU 620 is transmitted and before DTU 640 is transmitted, a closing flag 630 is transmitted. Closing flag 630 is indicative of another DTU 640 being sent before no more DTUs will be available for use of the present transmission opportunity 601.

A time from an instant t5 when closing flag 630 is sent to an end of downstream transmission at an instant t6 should be selected so that the customer premises unit has sufficient time to receive closing flag 630 and turn off receiver 104 right after the instant t6 when it received last transmitted symbol 640. This allows the customer premises unit to turn receiver 104 off in a duration that lasts from the last DTU or symbol 640 transmitted during downstream transmission opportunity 601 until a start of second downstream transmission opportunity 701 (in next TDD frame 700). Same applies also for the upstream.

At least one effect of the closing flag 630, 730 is that it can be issued any time and doesn't require evaluation of any probably future status of a transmission queue on layer 2 or above; packets appearing available for transmission even after the start of transmission opportunity 601, 701 can still be sent to be included in the current frame 600, 700, respectively. Thus, some delays may be avoided.

Now having regard to representations to form closing flag 630, in some embodiments closing flag 630 cam be a physical media dependent (PMD) signal. At least one effect can be that only a short time to detection may be needed when compared to other signal that is formed higher up, for example, in multi-layer communication 200. Some embodiments in a multicarrier transmission system can use a special data pattern transmitted on particular tones. A time required for detection of closing flag 630 in some embodiments can be less than 1 symbol. To simplify implementation, closing flag 630 can be sent before last symbol 640. An effect can be to avoid delay in switching the receiver off due to time required to detect closing flag. A specific position of closing flag within frame 600 can be predefined and may result in enhanced receiver operation characteristics.

Though reliability of closing flag 630 is desirable for closing flag 630 to achieve effects associated with the various embodiments according to the invention, losing closing flag 630 in transmission may not have critical effect on operation. If closing flag 630 should be lost, receiver 104 will assume that the received signal lasts till the end of transmission opportunity 601 while the received data is fully corrupted. Receiver 104 will, accordingly, send a NACK which transmitter 102 can ignore, since no actual data was transmitted after closing flag 630 plus last symbol(s) 640 were transmitted.

In some embodiments a closing flag may have the following properties. The closing flag may be sent some time before the actual end of the transmission, so that the processing time of the closing flag at receiver 104 does not cause additional waiting time for receiver 104 to switch itself off. In some embodiments a format of the closing flag may be chosen so as to provide some immunity to noise. Further in some embodiments the format of the closing flag may be chosen so as to be easily detectable. At least one effect can be a fast detectability of the closing flag, faster than detection of the data.

In one embodiment the closing flag can be a special bit pattern that is communicated over a management latency path, for example together with fast management information and/or ACK signals. In some embodiments practiced in a multi-carrier environment, the closing flag can be communicated as a special bit pattern such as an idle symbol bit pattern. In some embodiments the closing flag bit pattern can modulate one or more of a number of dedicated tones. In some implementations these tones to be modulated by the closing flag bit pattern may be selected during the initialization by recommendation (or request) from receiver 104, e.g., high SNR, low attenuation. In other embodiments, the bit pattern used for the closing flag can be encoded with a view to increase robustness. A method for encoding can include, for example, repetition encoding. Repetition encoding may be useful when the pattern may be send in more than one symbol before the end of transmission, so that the pattern sent in each symbol points on a same symbol to be the last symbol in the present transmission opportunity, when transmission will stop. In other embodiments the closing flag is provided as a special symbol which could be sent at the end of the transmission or before the end of the transmission, at a predefined time before the end of the transmission. This type of operation may sometimes require alignment between data unit boundaries with boundaries of the special symbol.

In other embodiments multiple closing flags can be used during a transmission opportunity to indicate time gaps in the transmission. In an embodiment each closing flag carries the information on the position of the upcoming stop of transmission and the duration of this stop (inside the same transmission opportunity). The transmission may continue after the stop and may be stopped again by the next flag.

Figure 7:
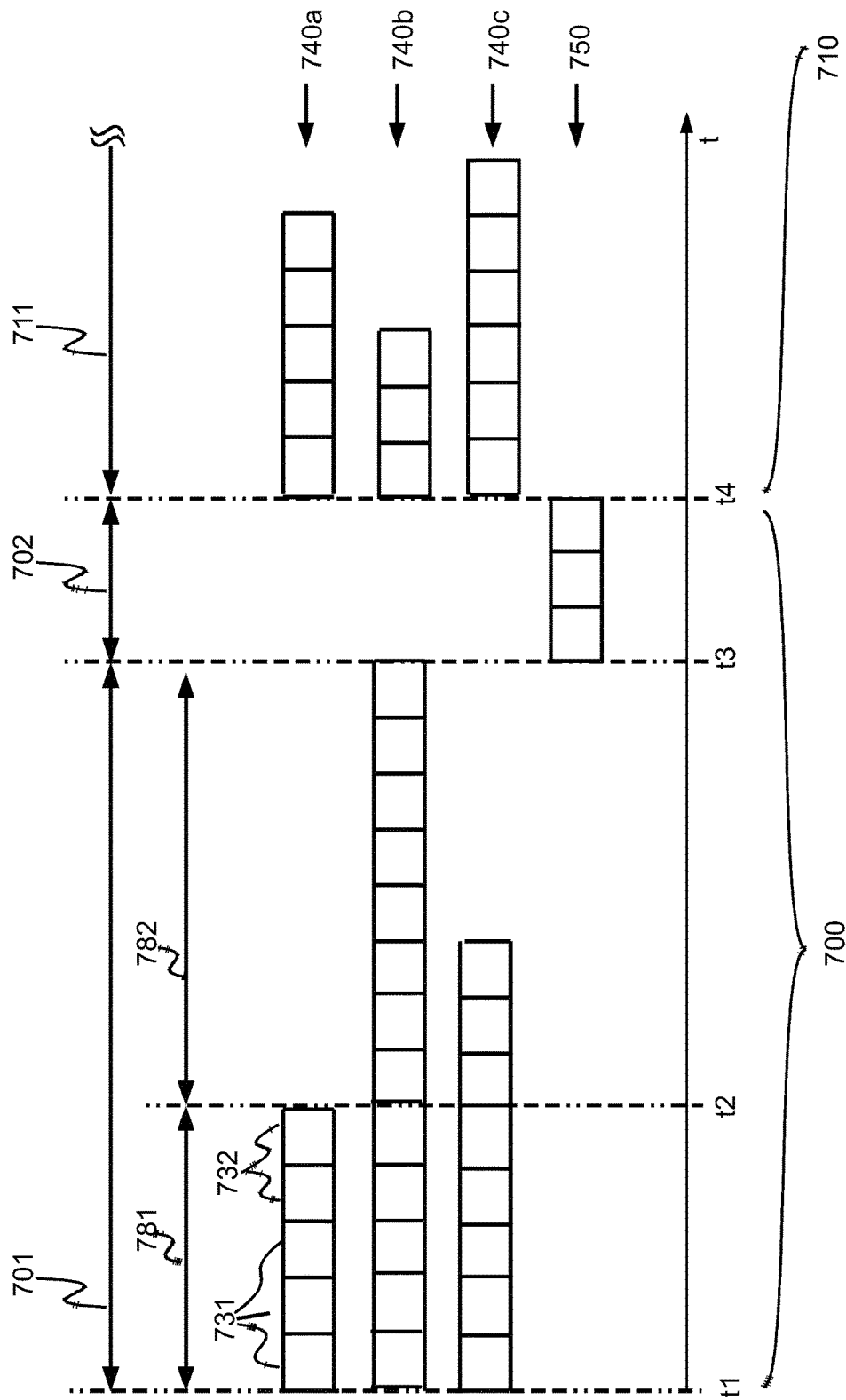
FIG. 7 is a time diagram illustrating transmission on a plurality of lines in some embodiments accordance to the invention.

FIG. 7 illustrates data transmission using a plurality of lines such as lines 106, 116 in accordance with some embodiments. As in embodiments discussed above, the transmission is in duplex mode. Further, for the purpose of illustration, FIG. 7 accordingly shows three timelines 740a, 740b, 740c for downstream transmission. In some embodiments, each timeline 740a, 740b, 740c represents changes in bit loading table, and/or transmit PSD table, and/or gains table for symbols following the respective timeline. Merely one timeline 750 is illustrated for upstream transmission. In other embodiments, all operational modes and details described herein with reference to downstream transmission can likewise be implemented for upstream transmission. Upstream transmission will not be further discussed.

In the embodiment illustrated in FIG. 7, a first TDD frame 700 provides first downstream transmission opportunity 701 lasting from time t1 to time t3 and second downstream opportunity 711 beginning at time t4. From time t3 to time t4, upstream transmission opportunity 702 is provided. Further, in accordance with some embodiments, First transmission opportunity has a first transmission mode section 781 lasting from time t1 to time t2 and a second transmission mode section 782 lasting from time t2 to time t3. While transmitting the payload portion in the first transmission mode, receiver 104 does not "expect" any end to data transmission other than the end of first transmission opportunity 701. However, as shown with reference to first timeline 740a, having transmitted three symbols 731 carrying useful payload, no further payload needs to be transmitted. In accordance with some embodiments transmitting unit 102 may add, on its own discretion, one or more dummy/idle symbols 732 after the actual number of symbols indicated as "end of payload portion" was transmitted. In some embodiments, management can instruct transmitter 102 to transmit idle symbols 732. Having, in the example, transmitted five symbols, and, for lack of other useful content to transmit, having therein transmitted at least one idle symbol 732, transmitter 102 changes, at time t2, transmission mode from the first transmission mode of "continuous transmission" to the second transmission mode of "discontinuous transmission". As shown in FIG. 7, other timelines thus continue to transmit respective payload portion and indicated, for example by sending a predetermined number of idle symbols 732 a completion of payload transmission.

In another embodiment, to facilitate discontinuous operation, inconvenient combinations of active discontinuous lines can be reduced or eliminated altogether by using Idle or similar symbols 732. In this embodiment a central controller (VCE) can collect from some or all transmitters 102, 112 an actual number of data symbols to be transmitted in one frame 700 (corresponding to an actual payload size of frame 700). The central controller can instruct each transmitter 102, 112 how many Idle symbols 732 should be added after transmission of data symbols 731 (after transmission of the payload).

Such operation co-ordinated by the central controller according to some embodiments during first transmission mode section 781 of transmission opportunity 701 can be further optimized when combined with different settings of bit loading and gains in the second transmission mode section 782 of transmission opportunity in frame 700, using discontinuous operation during second transmission mode section 782.

Thus, FIG. 7 presents a case when two Power Spectrum Density (PSD) settings and two bit loading tables are used: During first transmission mode section 781 a "Full performance" PSD setting and bit allocation table (BAT) are applied (can also be referred to as "FP-PSD" and "FP-BAT", respectively); during second transmission mode section 782 a "Discontinuous operation" PSD setting and BAT are applied (can also be referred to as "DO-PSD" and "DO-BAT", respectively). The discontinuous operation PSD setting and BAT can be optimized to provide a balance between power savings and performance loss; Idle symbols can be used to avoid combinations of active/discontinuous lines and thus help to avoid loss of high performance. In an embodiment the number of data symbols 731 (the actual payload size) is indicated to receiver 104. Thus, receiver 104 can shut down after all data was transmitted, thus saving power.

In some embodiments as presented, for each TDD frame 700, "Full performance" PSD setting and BAT can be used to support a "normal" operation from the beginning at time t1 of the TDD frame 700. Then, after timeline 740a, at time t2, discontinuous operation PSD setting and BAT can be applied to support discontinuous operation.

In some embodiments control parameters can be used to control operations disclosed herein: For example control parameters can be the number of data symbols 731 to be transmitted per TDD frame 700 (actual payload size) to change the mode of operation of receiver 104 for example from high power to low power, after the payload was received. Another control parameter can be a point in time (time t2) to indicate start of second transmission mode discontinuous operation.

At least one effect of using Idle symbols in accordance with some embodiments can be that Idle symbols can help to keep the transition timeline 740a stable from one TDD frame 700 to another TDD frame 710.

In some embodiments, timelines 740a, 740b, 740c can be subject to update. In some embodiments, update is scheduled periodically. An update can be done per TDD frame, per superframe, or on other terms. To facilitate the update, for example according to schedule pre-computed by the VCE, CPU 104, 114 can switch, for example, bit and gain (b&g) table.

In other embodiments multiple timelines and multiple sets of "Discontinuous operation" PSD setting and BAT can be used.

In some embodiments, some or all symbols carrying dummy information during transmission can be sent with 0 power (not transmitted). Receiver 104 interpret data units sent during these symbols as being corrupted. However, since sequence identifiers (ID) of dummy data units are assigned in a predefined way, receiver 104 will in some embodiments not issue any retransmission request so as to avoid reception of further receive data units inside the same TDD frame with continuing sequence ID. Thus no missed frames will be found, or will seem to have been found. In one implementation, boundaries of data units may be aligned with boundaries of symbols. An effect can be an increase in efficiency on discontinuous operation.

Discontinuous operation can suffer from potential loss of synchronization because some frames have very few or no symbol(s) to transmit. This may result in long time periods during which a phase locked loop (PLL) at the CPU is not updated and loop timing (i.e., providing CPU operates on the same clock as DPU) can fail. To avoid failure of loop timing, one or more embodiments of the invention propose to use so called "pilot symbols" in TDD frames where no active symbols or very few active symbols are transmitted.

In some embodiments, the system can use synchronization components: 1. A periodically sent symbol (sync symbol) containing a plurality of pilot tones, wherein some embodiments may have with a period of several TDD frames; 2. A number of tones in each transmitted data symbol being assigned as pilot tones (transmit a predefined dedicated bit pattern, no data); 3. A sync symbol containing also pilot tones of data symbols; 4. Pilot symbols being symbols that include pilot tones, or in some embodiments, only pilot tones, that may be the same as data symbols; while other tones are masked; and 5. In TDD frames where no sync symbols are present and also no or only a few data symbols are present, one or more pilot symbols being sent to maintain synchronization.

If no data symbol is transmitted at a position of the sync symbol in this TDD frame, the pilot symbol shall be transmitted at this position (sync symbol is transmitted every m TDD frame. In some embodiments the pilot symbol shall be transmitted at same time position in each frame.

One or more embodiments of the invention introduce special signals (superframe, sync symbols, MAP, etc.) and a protocol associated with transmission and reception of these signals. In one embodiment, methods, apparatus and systems are configured for use consistent with ITU standard G.fast standard.

Exemplary implementations/embodiments discussed herein may have various components collocated; however, it should be appreciated that the components of the arrangements may be combined into one or more apparatuses.

Although the disclosure has been shown and described with respect to one or more implementations, equivalent alterations and modifications will occur to others skilled in the art based upon a reading and understanding of this specification and the annexed drawings. Other permutations and combinations of the above-disclosed concepts are also contemplated as falling within the scope of the disclosure.

The disclosure includes all modifications and alterations and is limited only by the scope of the following claims. In particular regard to the various functions performed by the above described components (e.g., transmitter and/or receiver), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

In addition, the articles 'a' and 'an' as used in this application and the appended claims are to be construed to mean 'one or more'.

The invention claimed is:

1. A method, for use in communications, comprising:
providing a plurality of transmission opportunities for data to be transmitted, wherein a transmission opportunity in the plurality of transmission opportunities is configured to comprise a payload portion for payload data;
transmitting the payload portion, wherein the payload portion comprises a beginning portion from start of the payload portion and a completion portion at completion or end of the payload portion; and
transmitting control information after the beginning portion and before the completion portion, wherein the control information is indicative of an amount of payload data still in the payload portion after the control information until the completion portion of the payload portion is reached.

2. The method of claim 1, wherein payload data is represented by symbols, and wherein the control information is transmitted in a place of at least one symbol.

3. The method of claim 2, wherein the place of the at least one symbol is configurable.

4. The method of claim 1, wherein the transmission opportunity is provided as a time slot for data transmission.

5. The method of claim 1, wherein the control information is provided as a flag associated with a meaning.

6. The method of claim 5, wherein the flag, in a first state of operation, is associated with an idle operation, and wherein further the flag, in a second state of operation, is associated with there being payload to be transmitted to completion of the transmitting the payload portion.

7. The method of claim 5, wherein the flag, being transmitted in a first mode of transmitting the payload portion, is associated with future transmitting the payload portion in a second mode of transmitting the payload portion.

8. The method of claim 5, wherein the transmitting the payload portion uses a plurality of carriers, and wherein the transmitting the flag uses a subset of the plurality of carriers.

9. The method of claim 1, wherein the control information is transmitted at a time sufficiently early in transmitting the payload portion to allow a receiver to alter a state of operation at completion of transmitting the payload portion.

10. The method of claim 1, comprising, within the transmission opportunity, repeatedly transmitting the control information.

11. The method of claim 10, wherein the transmitting the control information is according to a predetermined plan.

* * * * *